(12) United States Patent
Hu et al.

(10) Patent No.: US 12,185,165 B2
(45) Date of Patent: Dec. 31, 2024

(54) COMMUNICATION METHOD AND NETWORK DEVICE

(71) Applicant: HUAWEI TECHNOLOGIES CO., LTD., Guangdong (CN)

(72) Inventors: Xingxing Hu, Shanghai (CN); Wenjie Peng, Shanghai (CN); Hongping Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 569 days.

(21) Appl. No.: 17/375,752

(22) Filed: Jul. 14, 2021

(65) Prior Publication Data
US 2021/0345182 A1    Nov. 4, 2021

Related U.S. Application Data

(63) Continuation of application No. PCT/CN2020/071788, filed on Jan. 13, 2020.

(30) Foreign Application Priority Data

Jan. 15, 2019    (CN) .......................... 201910038934.7

(51) Int. Cl.
*H04W 28/24*    (2009.01)
*H04W 28/02*    (2009.01)
*H04W 76/15*    (2018.01)

(52) U.S. Cl.
CPC ....... *H04W 28/24* (2013.01); *H04W 28/0257* (2013.01); *H04W 76/15* (2018.02)

(58) Field of Classification Search
CPC . H04W 28/24; H04W 28/0257; H04W 76/15; H04W 28/0268
See application file for complete search history.

(56) References Cited

U.S. PATENT DOCUMENTS

2017/0311211 A1    10/2017    Chiba et al.
2020/0260325 A1*    8/2020    Futaki ............... H04W 28/0967

FOREIGN PATENT DOCUMENTS

| CN | 105917702 A | 8/2016 |
| CN | 106100816 A | 11/2016 |
| CN | 108924876 A | 11/2018 |
| WO | 2018202153 A1 | 11/2018 |

OTHER PUBLICATIONS

Rapporteur (ZTE Corporation), "Agreements for MR-DC with 5GC," 3GPP TSG-RAN WG2 Meeting #103bis, R2-1816017, Chengdu, China, Sep. 8-12, 2018, 17 pages.

(Continued)

*Primary Examiner* — Eric Myers
(74) *Attorney, Agent, or Firm* — Fish & Richardson P.C.

(57) ABSTRACT

The present disclosure relates to communication methods and network devices. In one example method, a first network device receives a first message sent by a second network device, where the first message is used to notify whether the first network device configures a default data radio bearer (DRB), and the first network device and the second network device are network devices that provide a multi-connectivity service for a same terminal device. The first network device determines, based on the first message, whether to configure the default DRB.

22 Claims, 4 Drawing Sheets

(56) References Cited

OTHER PUBLICATIONS

ZTE Corporation (Rapporteur), "Summary of [103#47][NR late drop]—37.340 agreements," 3GPP TSG-RAN WG2 Meeting #103bis, R2-1814891. Chengdu, China, Oct. 8-12, 2018, 8 pages.
ZTE Corporation, "Discussion on Section 10 for TS 37.340," 3GPP TSG-RAN WG3 Meeting #96, R3-171512, Hangzhou, China, May 15-19, 2017, 5 pages.
3GPP TS 38.425 V15.4.0 (Dec. 2018), "3rd Generation Partnership Project; Technical Specification Group Radio Access Network; NG-RAN; NR user plane protocol (Release 15)," Dec. 2018, 23 pages.
Office Action in Chinese Application No. 201910038934.7, dated Mar. 9, 2021, 24 pages.
PCT International Search Report and Written Opinion in International Application No. PCT/CN2020/071788, dated Apr. 17, 2020, 15 pages.

\* cited by examiner

COMMUNICATION METHOD AND NETWORK DEVICE

CROSS-REFERENCE TO RELATED APPLICATIONS

This application is a continuation of International Patent Application No. PCT/CN2020/071788, filed on Jan. 13, 2020, which claims priority to Chinese Patent Application No. 201910038934.7, filed on Jan. 15, 2019. The disclosures of the aforementioned applications are hereby incorporated by reference in their entireties.

TECHNICAL FIELD

This application relates to the field of communication technologies, and in particular, to a communication method and a network device.

BACKGROUND

With emergence of diversified services and applications, a new quality of service (quality of service, QoS) management mapping mechanism is introduced in a 5th generation (5th generation, 5G) mobile communication system, to adapt to and meet diversified QoS requirements. In the 5G mobile communication system, a QoS architecture may be shown in FIG. 1. In the QoS architecture, a QoS flow is used as a basic granularity of QoS control, and two-level QoS mapping is introduced. A non-access stratum (non-access stratum, NAS) maps data packets having a same QoS requirement to one QoS flow. Then, an access stratum maps the QoS flow to a data radio bearer (data radio bearer, DRB), to meet different QoS requirements. In the 5G mobile communication system, a core network device implements service interaction with a terminal device by using a session. One or more sessions may be established between the core network device and the terminal device, and each session may include one or more QoS flows. In each session, each QoS flow may be identified by using a QoS flow identifier. In the QoS architecture, mapping between downlink data packets having a same QoS requirement and a downlink QoS flow may be implemented by the core network device, and mapping between uplink data packets having a same QoS requirement and an uplink QoS flow may be implemented by the terminal device. The terminal device may implement the mapping between the uplink data packets having the same QoS requirement and the uplink QoS flow in a manner in which the network device notifies the terminal device or in a manner in which a mapping relationship is preconfigured inside the terminal device. Mapping between the uplink and downlink QoS flows and DRBs may be implemented by the network device. The network device may notify a mapping rule between an uplink QoS flow and a DRB via a radio resource control (radio resource control, RRC) message, so that the terminal device learns of the mapping rule between an uplink QoS flow and a DRB. The terminal device may also learn of the uplink QoS flow and the DRB based on reflective mapping. The reflective mapping herein means that for each DRB, UE monitors an identifier of a QoS flow of a downlink data packet, and then maps an uplink data packet of the QoS flow to the same DRB. That is, the terminal device obtains a mapping relationship from the uplink QoS flow to the DRB based on a mapping relationship from the downlink QoS flow to the DRB.

One session may further be corresponding to one default DRB. If a mapping relationship between a QoS flow and a DRB is not configured for a QoS flow corresponding to an uplink data packet, that is, the network device does not notify the mapping relationship between a QoS flow and a DRB via an RRC message, when the terminal device cannot obtain the mapping relationship between a QoS flow and a DRB through reflective mapping, the terminal device maps a packet of the QoS flow to the default DRB. A default DRB corresponding to each session may be configured by a network device between a core network device and a terminal device to which the session belongs. In a 5G communication system that uses a dual-connectivity (dual connectivity, DC) or multi-connectivity technology, a terminal device may establish connections to and communicate with a plurality of network devices at the same time. That is, the plurality of network devices exist between a core network device and the terminal device, and are connected to the terminal device. If the plurality of network devices all establish default DRBs for a same session of the terminal device, one session may be corresponding to a plurality of default DRBs. Consequently, when performing uplink transmission, the terminal device cannot determine a DRB to which an uplink QoS flow that belongs to the session and for which a correspondence between a DRB and a QoS flow has not been configured should be mapped.

SUMMARY

This application provides a communication method and a network device, to solve a problem that a session is corresponding to a plurality of default DRBs in a dual-connectivity or multi-connectivity scenario.

According to a first aspect, a communication method is provided. The method may be applied to a network device, and includes: A first network device receives a first message sent by a second network device, where the first message is used to notify whether the first network device configures a default DRB, and the first network device and the second network device are network devices that provide a multi-connectivity service for a same terminal device. The first network device determines, based on the first message, whether the first network device configures the default DRB.

In this technical solution, the first network device and the second network device provide the multi-connectivity service for the same terminal device. This indicates that the first network device and the second network device are network devices in a dual-connectivity or multi-connectivity scenario. The second network device in the dual-connectivity or multi-connectivity scenario sends, to the first network device in the dual-connectivity or multi-connectivity scenario, the message used to notify whether the first network device configures the default DRB, and the first network device may determine, based on the first message, whether to establish the default DRB. In this way, in a dual-connectivity or multi-connectivity scenario, a plurality of network devices perform negotiation on a configuration status of one default DRB, to avoid a case in which the plurality of network devices all configure default DRBs for one session in the dual-connectivity or multi-connectivity scenario.

With reference to the first aspect, in some possible cases, the second network device may assign, to the first network device, permission to determine to configure the default DRB, and the first network device may configure the default DRB. The first network device configures the default DRB in the following cases:

In a first case, the first message includes a first DRB configuration indication, and the first DRB configuration indication is used to indicate that the first network device configures the default DRB. Correspondingly, that the first network device determines, based on the first message, whether the first network device configures the default DRB may include: The first network device determines, based on the first DRB configuration indication, to configure the default DRB.

In a second case, the first message includes a second DRB configuration indication, and the second DRB configuration indication is an indication indicating whether the first network device configures the default DRB. Correspondingly, that the first network device determines, based on the first message, whether the first network device configures the default DRB may include: If the second DRB configuration indication indicates that the first network device configures the default DRB, the first network device determines, based on the second DRB configuration indication, to configure the default DRB.

In a third case, the first message includes a first DRB configuration status indication, and the first DRB configuration status indication is used to indicate that the second network device has not configured the default DRB. Correspondingly, that the first network device determines, based on the first message, whether the first network device configures the default DRB may include: The first network device determines, based on the first DRB configuration status indication, to configure the default DRB.

In a fourth case, the first message includes a second DRB configuration status indication, and the second DRB configuration status indication is an indication indicating whether the second network device has configured the default DRB. Correspondingly, that the first network device determines, based on the first message, whether the first network device configures the default DRB may include: If the second DRB configuration status indication indicates that the second network device has not configured the default DRB, the first network device determines, based on the second DRB configuration status indication, to configure the default DRB.

In a fifth case, the first message includes a first indication, the first indication is used to indicate that the first QoS flow is carried on the first network device, the first QoS flow is a QoS flow of a first session, and the first session is a session corresponding to the default DRB. Correspondingly, that the first network device determines, based on the first message, whether the first network device configures the default DRB may include: The first network device determines, based on the first indication, to configure the default DRB. In a specific implementation, the first QoS flow may be a QoS flow with a highest occurrence frequency in one or more QoS flows of the first session.

In a sixth case, the first message includes a second indication, the second indication is used to indicate that all QoS flows of a first session are carried on the first network device, and the first session is a session corresponding to the default DRB. Correspondingly, that the first network device determines, based on the first message, whether the first network device configures the default DRB may include: The first network device determines, based on the second indication, to configure the default DRB.

In a seventh case, the first message includes a third indication, the third indication is used to indicate that a first default DRB configured by the second network device for a first session is transferred to the first network device, and that all QoS flows carried on the first default DRB are carried on the first network device, and the first session is a session corresponding to the default DRB. Correspondingly, that the first network device determines, based on the first message, whether the first network device configures the default DRB may include: The first network device determines, based on the third indication, to configure the default DRB.

This application is not limited to the foregoing case. In an optional implementation, there may be more cases in which the first network device configures the default DRB.

In an optional case, after the second network device assigns, to the first network device, the permission to determine to configure the default DRB, the first network device may alternatively determine not to configure the default DRB. That is, in the foregoing cases, that the first network device determines, based on the first message, whether the first network device configures the default DRB may alternatively be: The first network device determines, based on the first message, not to configure the default DRB.

In an optional case, after determining to configure the default DRB, the first network device may further determine when to configure the default DRB. That is, in the several cases, after the first network device determines, based on the first message, whether the first network device configures the default DRB, the method may further include: The first network device determines a moment at which the default DRB is configured.

Based on the foregoing cases, the second network device may assigns, to the first network device, the permission to determine to configure the default DRB, thereby completing negotiation on the configuration status of the default DRB.

With reference to the first aspect, when the first message is the sixth case, after the first network device determines, based on the second indication, to configure the default DRB, the method further includes: The first network device receives a second message sent by the second network device, where the second message is used to notify the first network device that a portion of the QoS flows of the first session are carried on the second network device. If the default DRB has been configured, the first network device cancels the configuration of the default DRB based on the second message. By canceling the configuration of the default DRB, the permission to determine to configure the default DRB is returned to the second network device.

With reference to the first aspect, in a possible case, after the first network device determines, based on the first message, whether the first network device configures the default DRB, the method further includes: After configuring the default DRB, if the first network device releases the default DRB, the first network device sends a release indication to the second network device, where the release indication is used to indicate that the first network device has released the default DRB. After releasing the default DRB, the first network device notifies the second network device, so that the second network device can configure a default DRB.

With reference to the first aspect, in a possible case, after the first network device determines, based on the first message, whether the first network device configures the default DRB, the method further includes: After configuring the default DRB, the first network device sends configuration information of the default DRB to the terminal device. The configuration information of the default DRB is sent to the terminal device, so that the terminal device may determine the configuration of the default DRB. In this case, during uplink transmission, the terminal device may map, to the default DRB, an uplink QoS flow for which a correspondence between a DRB and a QoS flow is not configured.

With reference to the first aspect, in some possible cases, the second network device may not assign, to the first network device, the permission to determine to configure the default DRB. If the permission to determine to configure the default DRB is not assigned to the first network device, the second network device notifies the first network device not to configure the default DRB, and that the first network device does not configure the default DRB may include the following cases:

In a first case, the first message includes a third DRB configuration indication, and the third DRB configuration indication is used to indicate that the first network device does not configure the default DRB. Correspondingly, that the first network device determines, based on the first message, whether the first network device configures the default DRB may include: The first network device determines, based on the third DRB configuration indication, not to configure the default DRB.

In a second case, the first message includes a third DRB configuration status indication, and the third DRB configuration status indication is used to indicate that the first network device has configured the default DRB. Correspondingly, that the first network device determines, based on the first message, whether the first network device configures the default DRB may include: The first network device determines, based on the third DRB configuration status indication, not to configure the default DRB.

With reference to the first aspect, in a possible case, after the first network device determines, based on the first message, whether the first network device configures the default DRB, the method further includes: The first network device sends a third message to the second network device, where the third message is used to indicate that the first network device has not configured the default DRB or the first network device has configured the default DRB. The first network device sends, to the second network device, an indication used to indicate whether the first network device has configured the default DRB, so that the second network device may determine a configuration status of the default DRB by the first network device.

With reference to the first aspect, in a possible case, if the first network device has not configured the default DRB, the third message includes a reason why the first network device has not configured the default DRB.

With reference to the first aspect, in a possible case, the first network device is a primary network device, and the second network device is a secondary network device; or the first network device is a secondary network device, and the second network device is a primary network device.

According to a second aspect, a method for configuring a default data radio bearer is provided. The method may be applied to a network device, and includes: If a first network device is a primary network device, the first network device determines to configure a default DRB, and the first network device provides a communication service for a terminal device.

With reference to the second aspect, in a possible case, if the first network device is a secondary network device, the first network device determines not to configure the default DRB.

According to a third aspect, a network device is provided. The network device is configured to perform the communication method described in the first aspect or the method for configuring a default data radio bearer described in the second aspect. The network device may include a memory and a processor coupled to the memory. The memory is configured to store program code of the communication method described in the first aspect or the method for configuring a default data radio bearer described in the second aspect, and the processor is configured to execute the program code stored in the memory. That is, the method provided in the first aspect, the method provided in any one of the possible cases of the first aspect, the method provided in the second aspect, or the method provided in any one of the possible cases of the second aspect is performed.

According to a fourth aspect, another network device is provided. The network device may include a plurality of function modules, configured to correspondingly perform the method provided in the first aspect, the method provided in any one of the possible cases of the first aspect, the method provided in the second aspect, or the method provided in any one of possible cases of the second aspect.

According to a fifth aspect, a computer-readable storage medium is provided. The computer-readable storage medium stores instructions. When the instructions are run on a computer, the computer is enabled to perform the communication method described in the first aspect or the method for configuring a default data radio bearer described in the second aspect.

According to a sixth aspect, a computer program product including instructions is provided. When the computer program product is run on a computer, the computer is enabled to perform the communication method described in the first aspect or the method for configuring a default data radio bearer described in the second aspect.

DESCRIPTION OF EMBODIMENTS

The following describes technical solutions in embodiments of this application with reference to the accompanying drawings in the embodiments of this application.

Figure 2:
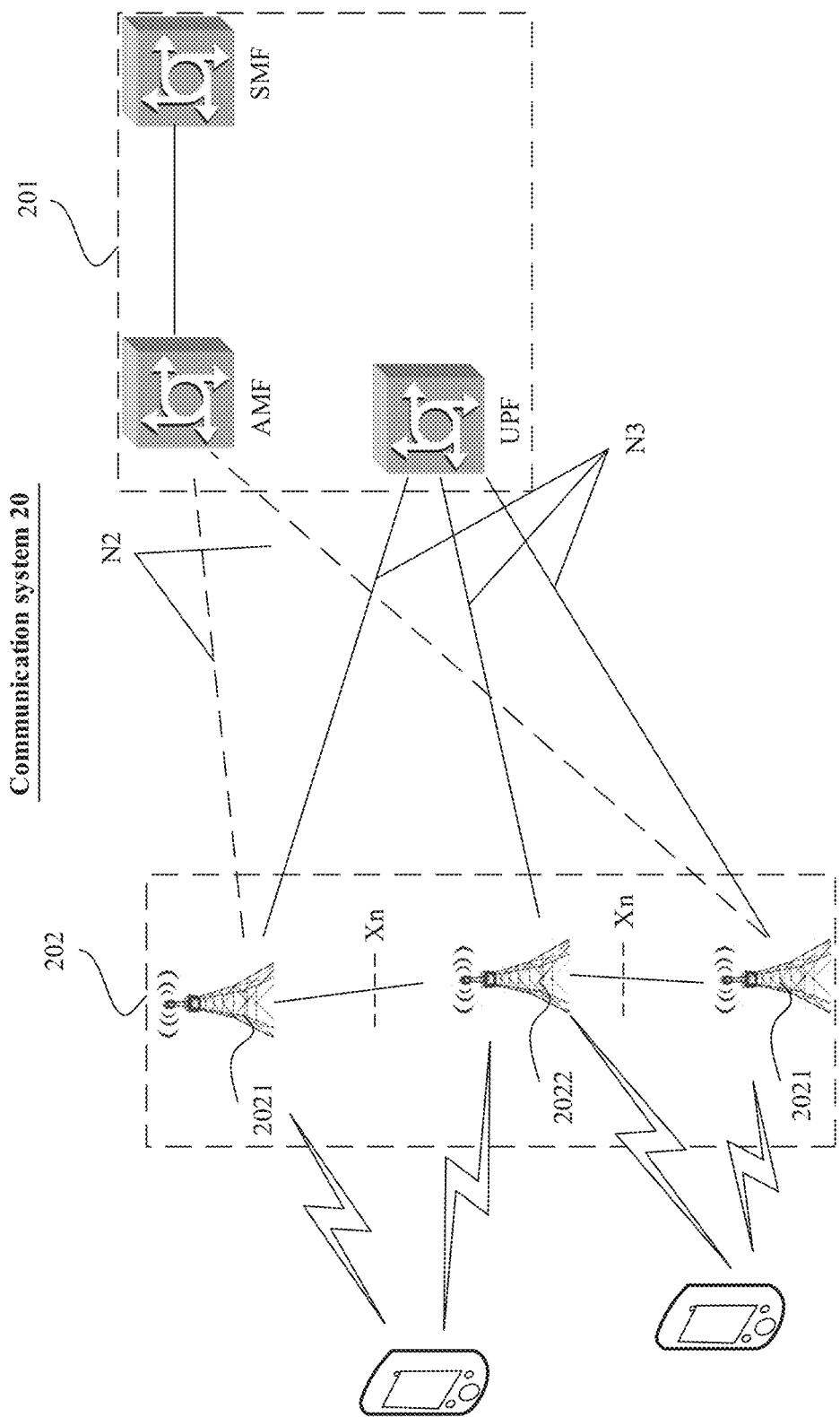
FIG. 2 is a schematic architectural diagram of a communication system according to an embodiment of this application.

The technical solutions of this application may be applied to a communication system in which a QoS flow is used as a basic granularity of QoS control and that uses a dual-connectivity or multi-connectivity technology. FIG. 2 is a schematic architectural diagram of a communication system 20 according to this application. As shown in FIG. 2, the communication system 20 may include a core network device 201 and a network device 202, where the network device 202 is configured to provide a communication service for a terminal device. The core network device 201 is configured to provide service support and perform service control for the network device 202. Specifically, the communication system includes but is not limited to a 5G mobile communication system and a future communication system.

In a possible case, the core network device 201 may include network elements that belong to a core network, for example, an access and mobility management function (access and mobility function, AMF) network element, a session management function (session management function, SMF) network element, and a user plane function (user plane function, UPF) network element. The AMF and the SMF are network elements located on a control plane of the core network, the AMF and the SMF may be configured to process control plane signaling, and control plane signaling interaction may be completed between the AMF and the network device through an N2 connection. The UPF is a network element located on a user plane of the core network, the UPF may be configured to process user plane data, and user plane data exchange may be completed between the UPF and the network device through an N3 connection.

The network device 202 is an apparatus that is deployed in a radio access network and that is configured to provide a wireless communication function for the terminal device. The network device may perform wireless communication with the terminal device by using a wireless transmission medium in wireless transmission space. Specifically, the network device 202 may include a macro base station, a micro base station (also referred to as a small cell), a relay station, an access point, transmission reception point (Transmission Receiver point, TRP), and the like in various forms. In systems that use different radio access technologies, names of the network device may be different. For example, in a 5G system, the network device is referred to as a next generation NodeB (generation NodeB, gNB). Alternatively, the network device may be an evolved universal terrestrial radio access NodeB (Evolved universal terrestrial radio access network NodeB, eNB) connected to a 5G core network, or the like. For ease of description, in all the embodiments of this application, apparatuses that provide a wireless communication function for the terminal device are collectively referred to as network devices.

In a communication system that uses a dual-connectivity technology or a multi-connectivity technology, the network device 202 may include a plurality of network devices that provide a dual-connectivity service or a multi-connectivity service for a same terminal device. That the plurality of network devices provide the dual-connectivity service or multi-connectivity service for the same terminal device means that the plurality of network devices all establish connections to and communicate with the same terminal device, so that resources of the plurality of network devices are used to provide a communication service for the terminal device, and the connections between the plurality of network devices and the terminal device are referred to as dual-connectivity or multi-connectivity. Specifically, the plurality of network devices that provide the multi-connectivity service for the same terminal device may include two types of network devices. One type is a network device that has a control plane connection to a core network device. The device that has the control plane connection to the core network device may be referred to as a primary network device. Specifically, the network device that has the control plane connection to the core network device may be a network device connected to the AMF, for example, a network device 2021 in FIG. 2. The other type is a network device that has no control plane connection to the core network device. The device that has no control plane connection to the core network device may be referred to as a secondary network device. Specifically, the network device that has no control plane connection to the core network device may be a network device that is not connected to the AMF, for example, a network device 2022 in FIG. 2. It should be noted that the network device having the control plane connection to the core network device and the network device having no control plane connection to the core network device are both for the same terminal device. The network device that has no control plane connection to the core network may be a network device that is corresponding to another terminal device and that has a control plane connection to the core network device. For example, when the network device 2022 shown in FIG. 2 provides a wireless communication function for another terminal device other than the terminal device shown in FIG. 2, the network device 2022 may be connected to the AMF through an N2 connection, and becomes a network device that has a control plane connection to the core network device, that is, becomes a network device that is corresponding to the another terminal device and that has the control plane connection to the core network device. In this application, the plurality of network devices that provide the dual-connectivity service or multi-connectivity service for the same terminal device may be network devices that provide a same radio access standard, or may be network devices that provide different radio access standards. For example, one is a network device that provides wireless new radio (New Radio, NR) access, and another one is a network device that provides evolved universal terrestrial radio access (evolved universal terrestrial radio access, E-UTRA).

In this embodiment of this application, one of the plurality of network devices that have a dual-connectivity relationship or multi-connectivity relationship with the terminal device is enabled to send, to another one of the plurality of network devices, a message for notifying whether the another network device configures a default DRB. In this way, the another network device may determine, based on the message, whether to configure the default DRB, to complete negotiation between the plurality of network devices on a configuration status of the default DRB, thereby preventing the plurality of network devices from establishing a plurality of default DRBs for a same session.

Because a principle and a procedure of configuring a default DRB for each session are the same, the solutions of this application are described below by using negotiation on a configuration status of a default DRB corresponding to a session. An example in which the session corresponding to the default DRB is a first session is used for description below. The first session is a session of a terminal device that has a dual-connectivity or multi-connectivity relationship with a plurality of network devices.

Figure 3:
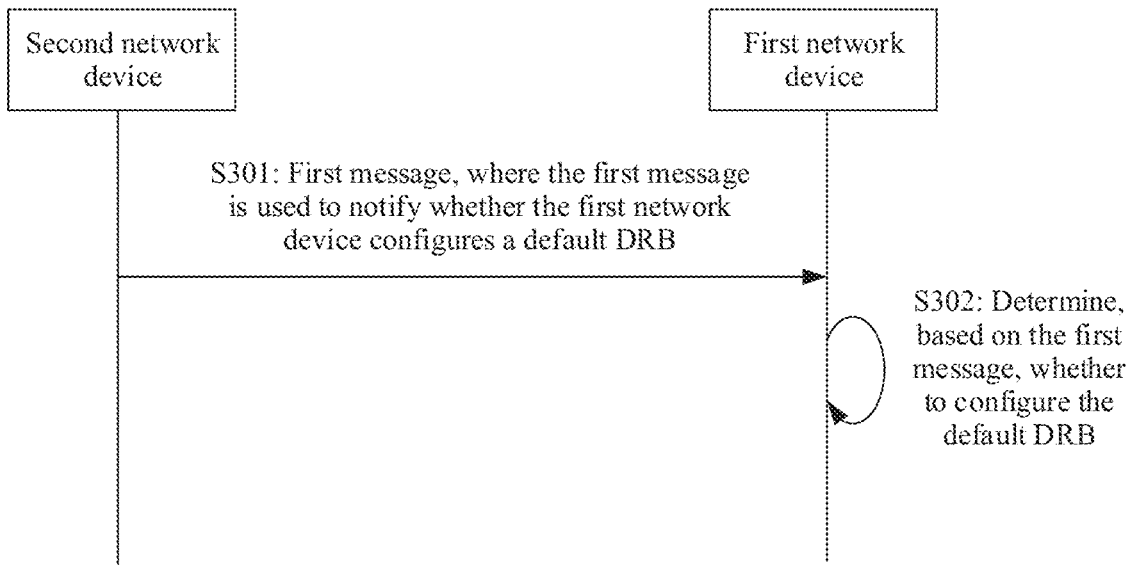
FIG. 3 is a schematic flowchart of a communication method according to an embodiment of this application.

FIG. 3 is a schematic flowchart of a communication method according to an embodiment of this application. The method is described from an interaction perspective. The method may include but is not limited to the following steps:

Step S301: A second network device sends a first message to a first network device, where the first message is used to notify whether the first network device configures a default DRB, and the first network device receives the first message.

Step S302: The first network device determines, based on the first message, whether the first network device configures the default DRB.

The second network device and the first network device in step S301 and step S302 are network devices that provide a multi-connectivity service for a same terminal device. The second network device may be a primary network device, and the first network device may be a secondary network device. Alternatively, the first network device may be a primary network device, and the second network device may be a secondary network device. For concepts of the network devices providing the multi-connectivity service for the same terminal device, the primary network device, and the secondary network device, refer to the foregoing descriptions.

The default DRB in step S301 and step S302 is a DRB used to carry a second QoS flow, and the second QoS flow may be an uplink QoS flow that is in a first session and for which a mapping relationship between the uplink QoS flow and a DRB has not been configured. Herein, a session may be understood as an association established between a terminal device and a data network (data network, DN) to implement one or more services, where the DN provides a service for the terminal device. A name of the session may vary in different communication systems. For example, in a 5G communication system, the session is referred to as a protocol data unit (protocol data unit, PDU) session.

The first message in step S301 and step S302 is a message that enables the first network device and the second network device to complete negotiation on a configuration status of the default DRB. After receiving the first message, the first network device may determine a network device configuring the default DRB.

In some possible cases, the first message may carry indication information. The indication information may be indication information that implements a function of indicating that the second network device has assigned, to the first network device, permission to determine to configure the default DRB. Based on the indication information, the first network device may determine whether to configure the default DRB, to complete negotiation on permission to configure the default DRB between the first network device and the second network device. The following specifically describes cases of indication information that is carried in the first message and that may implement a function of indicating that the second network device has assigned, to the first network device, the permission to determine to configure the default DRB.

Case 1: The first message may include a first DRB configuration indication, where the first DRB configuration indication is used to indicate that the first network device configures the default DRB. Herein, a meaning of the first DRB configuration indication may be that the first network device is allowed to configure the default DRB. After receiving the first message, the first network device may learn, based on the first DRB configuration indication in the first message, that the second network device has assigned, to the first network device, the permission to determine to configure the default DRB, and the first network device may determine to configure the default DRB. That is, the first network device may determine, based on the first DRB configuration indication, to configure the default DRB. Further, the first network device may further determine when to configure the default DRB. To be specific, after determining, based on the first DRB configuration indication, to configure the default DRB, the first network device further determines a moment at which the default DRB is configured. Optionally, the first network device may alternatively determine not to configure the default DRB. That is, the first network device determines, based on the first DRB configuration indication, not to configure the default DRB.

Optionally, if the first message does not include the first DRB configuration indication, after receiving the first message, the first network device determines not to configure the default DRB.

Optionally, another meaning of the first DRB configuration indication may alternatively be explicitly indicating that the first network device configures the default DRB. In this case, after receiving the first message, the first network device determines, based on the first DRB configuration indication, to configure the default DRB. Further, after determining, based on the first DRB configuration indication, to configure the default DRB, the first network device may further determine a moment at which the default DRB is configured.

Case 2: The first message includes a first DRB configuration status indication, where the first DRB configuration status indication is used to indicate that the second network device has not configured the default DRB. After receiving the first message, the first network device may learn, based on the first DRB status configuration indication in the message, that the second network device has assigned, to the first network device, the permission to determine to configure the default DRB, and the first network device may determine to configure the default DRB. That is, the first network device may determine, based on the first DRB status configuration indication, to configure the default DRB. Further, the first network device may further determine when to configure the default DRB. To be specific, after determining, based on the first DRB configuration status indication, to configure the default DRB, the first network device further determines a moment at which the default DRB is configured. Optionally, the first network device may alternatively determine not to configure the default DRB. That is, the first network device may determine, based on the first DRB status configuration indication, not to configure the default DRB.

Optionally, if the first message does not include the first DRB configuration indication, after receiving the first message, the first network device determines not to configure the default DRB.

Case 3: The first message includes a first indication, where the first indication is used to indicate that a first QoS flow is carried on the first network device, and the first QoS flow is a QoS flow of the first session. After receiving the first message, the first network device may learn, based on the first indication in the first message, that the second network device has assigned, to the first network device, the permission to determine to configure the default DRB, and the first network device may determine to configure the default DRB. That is, the first network device may determine, based on the first indication, to configure the default DRB. Further, after receiving the first message, the first network device may further determine when to configure the default DRB. To be specific, after determining, based on the first indication, to configure the default DRB, the first network device further determines a moment at which the default DRB is configured. Optionally, the first network device may alternatively determine not to configure the default DRB. That is, the first network device may determine, based on the first indication, not to configure the default DRB. Herein, the first QoS flow may be a QoS flow that is in QoS flows of the first session and that is different from another QoS flow in an aspect. For example, the first QoS flow may be a QoS flow with a highest occurrence frequency in the QoS flows of the first session. It should be noted that the QoS flow with the highest occurrence frequency herein may be a QoS flow that may occur most frequently and that is predicted by using a specific algorithm, and an actual occurrence frequency of the QoS flow with the highest occurrence frequency is not necessarily the highest in the QoS flows of the first session. Optionally, if the first QoS flow is the QoS flow with the highest occurrence frequency, the first indication may be additional QoS flow information (additional QoS flow information), and this information indicates that a QoS flow in a session is most likely to occur more frequently than other one or more QoS flows in the session. Herein, that the first QoS flow is carried on the first network device may mean that a mapping relationship that is between a QoS flow and a DRB and that is corresponding to the first QoS flow is determined by the first network device. For example, a service data adaptation protocol (service data adaptation protocol, SDAP) layer is responsible for the mapping relationship between a QoS flow and a DRB, and that the first QoS flow is carried on the first network device may mean that an SDAP layer corresponding to the first QoS flow is located in the first network device.

Optionally, if the first message does not include the first indication, after receiving the first message, the first network device may determine not to configure the default DRB.

Case 4: The first message includes a second indication, where the second indication is used to indicate that all QoS flows of the first session are carried on the first network device. After receiving the first message, the first network device may learn, based on the second indication in the first message, that the second network device has assigned, to the first network device, the permission to determine to configure the default DRB, and the first network device may determine to configure the default DRB. That is, the first network device determines, based on the second indication, to configure the default DRB. Further, the first network device may further determine when to configure the default DRB. To be specific, after determining, based on the second indication, to configure the default DRB, the first network device further determines a moment at which the default DRB is configured. Optionally, the first network device may alternatively determine not to configure the default DRB. That is, the first network device may determine, based on the second indication, not to configure the default DRB. Optionally, that all QoS flows of the first session are carried on the first network device may mean that a mapping relationship that is between a QoS flow and a DRB and that is corresponding to all the QoS flows of the first session is determined by the first network device. For example, an SDAP layer is responsible for the mapping relationship between a QoS flow and a DRB, and that all QoS flows of the first session are carried on the first network device may mean that an SDAP layer corresponding to all the QoS flows is located in the first network device.

Optionally, after all the QoS flows of the first session are carried on the first network device, if a core network device notifies the second network device that a new QoS flow is added to the first session and the new QoS flow is carried on the second network device, the second network device may send a second message to the first network device, to indicate whether the first network device configures the default DRB. In a possible implementation, the second message may be used to indicate that the new QoS flow is carried on the first network device. In another possible implementation, the second message may be used to notify the first network device that a portion of the quality of service flows of the first session are carried on the second network device. If the second message is used to indicate that the new QoS flow is carried on the first network device, after receiving the second message, if the default DRB has been configured, the first network device may retain the configuration of the default DRB. If the second message is used to notify the first network device that a portion of the quality flows of the first session are carried on the second network device, after receiving the second message, if the default DRB has been configured, the second network device may cancel the configuration of the default DRB. That is, the original default DRB is changed to a non-default DRB, and the permission to determine to configure the default DRB may also be canceled. The first network device may also retain the configuration of the default DRB, and may also continue to retain the permission to determine to configure the default DRB.

Case 5: The first message includes a third indication, where the third indication is used to indicate that a first default DRB configured by the second network device for the first session is transferred to the first network device. After receiving the first message, the first network device may learn, based on the third indication in the first message, that the second network device has assigned, to the first network device, the permission to determine to configure the default DRB, and the first network device may determine to configure the default DRB. That is, the first network device determines, based on the third indication, to configure the default DRB. Further, the first network device may further determine when to configure the default DRB. To be specific, after determining, based on the third indication, to configure the default DRB, the first network device further determines a moment at which the default DRB is configured. Optionally, the first network device may alternatively determine not to configure the default DRB. That is, the first network device may determine, based on the third indication, not to configure the default DRB. Optionally, the third indication is used to indicate that the first default DRB configured by the second network device for the first session is transferred to the first network device, and all QoS flows carried on the first default DRB are carried on the first network device. Optionally, that all QoS flows carried on the first default DRB are carried on the first network device means that a mapping relationship that is between a QoS flow and a DRB and that is corresponding to a QoS is determined by the first network device. For example, a service data adaptation protocol SDAP layer is responsible for the mapping relationship between a QoS flow and a DRB, and that all QoS flows carried on the first default DRB are carried on the first network device may mean that an SDAP layer corresponding to the QoS flows is located in the first network device.

Herein, that the first network device determines to configure the default DRB may be specifically: The first network device determines the first default DRB as the default DRB of the first session, that is, the first network device retains the configuration of the first default DRB. Alternatively, the first network device configures, as the default DRB, another DRB that is corresponding to the first session and that is not the first default DRB, that is, the first network device cancels the configuration of the first default DRB, and configures the another DRB as the default DRB. In a possible design, after the first network device retains the configuration of the first default DRB, when no other message that is sent by the second network device and that is used to indicate whether the first network device configures the default DRB is received, the first network device cannot configure the another DRB as the default DRB. In another possible design, after retaining the configuration of the first default DRB, the first network device may configure the another DRB as the default DRB.

Herein, that the first network device determines not to configure the default DRB may be specifically: The first network device cancels the configuration of the first default DRB.

This application is not limited to the foregoing cases. In an optional implementation, there may be more cases of indication information that may implement a function of indicating that the second network device has assigned, to the first network device, the permission to determine to configure the default DRB. This is not limited in this embodiment of this application.

Herein, in the foregoing several cases, if the permission to determine to configure the default DRB has been assigned to the first network device, the first network device has permission to configure the default DRB, and the second network device does not have the permission to configure the default DRB. The second network device does not configure the default DRB. The second network device does not configure the default DRB, and assigns, to the first network device, the permission to determine to configure the default DRB, to complete negotiation on the permission to configure the default DRB. In this way, a case in which a plurality of network devices all configure default DRBs for one session in a dual-connectivity or multi-connectivity scenario may be avoided.

In some other possible cases, indication information carried in the second message may alternatively be indication information that implements a function of indicating that the second network device has not assigned, to the first network device, the permission to determine to configure the default DRB. Based on the indication information, the first network device may determine not to configure the default DRB, to complete negotiation on the permission to configure the default DRB between the first network device and the second network device. The following specifically describes a case of indication information that is carried in the first message and that may implement a function of indicating that the second network device has not assigned, to the first network device, the permission to determine to configure the default DRB.

Case 1: The first message includes a third DRB configuration indication, where the third DRB configuration indication is used to indicate that the first network device does not configure the default DRB. After receiving the first message, the first network device may learn, based on the third DRB configuration indication in the first message, that the second network device has not assigned, to the first network device, the permission to determine to configure the default DRB, and the first network device may determine, based on the third DRB configuration indication, not to configure the default DRB.

Optionally, when the first message does not include the third DRB configuration indication, after receiving the first message, the first network device may learn that the second network device has assigned, to the first network device, the permission to determine to configure the default DRB, and the first network device may determine to configure the default DRB. That is, the first network device determines to configure the default DRB. Further, the first network device may further determine when to configure the default DRB. To be specific, after determining to configure the default DRB, the first network device further determines a moment at which the default DRB is configured. Optionally, the first network device may alternatively determine not to configure the default DRB. That is, the first network device determines not to configure the default DRB.

Case 2: The first message includes a third DRB configuration status indication, and the third DRB configuration status indication is used to indicate that the second network device has configured the default DRB. After receiving the first message, the first network device may learn, based on the third DRB configuration status indication in the first message, that the second network device has not assigned, to the first network device, the permission to determine to configure the default DRB, and the first network device determines, based on the third DRB configuration status indication, not to configure the default DRB.

Optionally, when the first message does not include the third DRB configuration status indication, after receiving the first message, the first network device may learn that the second network device has assigned, to the first network device, the permission to determine to configure the default DRB, and the first network device may determine to configure the default DRB. That is, the first network device determines to configure the default DRB. Further, the first network device may further determine when to configure the default DRB. To be specific, after determining to configure the default DRB, the first network device further determines a moment at which the default DRB is configured. Optionally, the first network device may alternatively determine not to configure the default DRB. That is, the first network device determines not to configure the default DRB.

This application is not limited to the foregoing cases. In an optional implementation, there may be more cases of indication information that may implement a function of indicating that the second network device has not assigned, to the first network device, the permission to determine to configure the default DRB. This is not limited in this embodiment of this application.

Herein, in the foregoing several cases, if the permission to determine to configure the default DRB has not been assigned to the first network device, the first network device does not have the permission to configure the default DRB, and the second network device has the permission to configure the default DRB. The second network device may configure the default DRB, or may not configure the default DRB. Because the indication information is used to indicate that the first network device does not have the permission to configure the default DRB, a case in which a plurality of network devices all configure default DRBs for one session in a dual-connectivity or multi-connectivity scenario can be avoided.

In still some possible cases, the indication information carried in the first message may alternatively be an indication message that implements a function of indicating that whether the second network device has assigned, to the first network device, the permission to determine to configure the default DRB. Based on the indication information, the first network device may determine, based on a specific meaning of an indication, whether the first network device has the decision right of the default DRB, and then determine whether to configure the default DRB, to complete negotiation on the permission to configure the default DRB. The following specifically describes a case of indication information that is carried in the first message and that may implement a function of indicating whether the second network device has assigned, to the first network device, the permission to determine to configure the default DRB.

Case 1: The first message includes a second DRB configuration indication, where the second DRB configuration indication is an indication indicating whether the first network device configures the default DRB. After receiving the first message, the first network device may determine, based on the second DRB configuration indication in the first message, whether the second network device has assigned, to the first network device, the permission to determine to configure the default DRB. If the second DRB configuration indication indicates that the first network device configures the default DRB, the first network device may learn that the second network device has assigned, to the first network device, the permission to determine to configure the default DRB, and the first network device may determine to configure the default DRB. That is, the first network device may determine, based on the second DRB configuration indication, to configure the default DRB. Further, after receiving the first message, the first network device may determine to configure the default DRB, and may further determine when to configure the default DRB. To be specific, after determining, based on the second DRB configuration indication, to configure the default DRB, the first network device may further determine a moment at which the default DRB is configured. Optionally, if the second DRB configuration indication indicates that the first network device configures the default DRB, the first network device may alternatively determine not to configure the default DRB. That is, the first network device determines, based on the second DRB configuration indication, not to configure the default DRB. If the second DRB configuration indication indicates that the first network device does not configure the default DRB, the first network device may learn that the second network device has not assigned, to the first network device, the permission to determine to configure the default DRB, and the first network device determines, based on the second configuration indication, not to configure the default DRB.

Case 2: The first message includes a second DRB configuration status indication, where the second DRB configuration status indication is an indication indicating whether the second network device has configured the default DRB. After receiving the first message, the first network device may determine, based on the second DRB configuration status indication in the first message, whether the second network device has assigned, to the first network device, the permission to determine to configure the default DRB. If the second DRB configuration status indication indicates that the second network device has not configured the default DRB, the first network device may learn that the second network device has assigned, to the first network device, the permission to determine to configure the default DRB, and the first network device may determine to configure the default DRB. That is, the first network device may determine, based on the second DRB configuration status indication, to configure the default DRB. Further, the first network device may further determine when to configure the default DRB. To be specific, after determining, based on the second DRB configuration status indication, to configure the default DRB, the first network device may further determine a moment at which the default DRB is configured. Optionally, if the second DRB configuration status indication indicates that the second network device has not configured the default DRB, the first network device may alternatively determine not to configure the default DRB. That is, the first network device determines, based on the second DRB status configuration indication, not to configure the default DRB. If the second DRB configuration status indication indicates that the first network device has configured the default DRB, the first network device learns that the second network device has not assigned, to the first network device, the permission to determine to configure the default DRB, and the first network device determines, based on the second DRB configuration status indication, not to configure the default DRB.

This application is not limited to the foregoing cases. In an optional implementation, there may be more cases of indication information that may implement a function of indicating whether the second network device has assigned, to the first network device, the permission to determine to configure the default DRB. This is not limited in this embodiment of this application.

In specific implementation, the foregoing indication information that may indicate whether the permission to determine to configure the default DRB has been assigned to the first network device may correspond to two different values. The different values may be used to respectively indicate that the second network device has assigned, to the first network device, the permission to determine to configure the default DRB, and that the second network device has not assigned, to the first network device, the permission to determine to configure the default DRB. For example, if the foregoing second DRB configuration indication is an indication that occupies 1 bit, the second DRB configuration indication may be 0, indicating that the first network device configures the default DRB; and the second DRB configuration indication may be 1, indicating that the first network device does not configure the default DRB. Alternatively, the second DRB configuration indication may be 1, indicating that the first network device configures the default DRB; and the second DRB configuration indication may be 0, indicating that the first network device does not configure the default DRB. Optionally, if the foregoing indication information that implements the function of indicating whether the permission to determine to configure the default DRB has been assigned to the first network device is an indication occupying one Boolean variable, the indication information may be true, indicating that the first network device configures the default DRB; and the indication information may be false, indicating that the first network device does not configure the default DRB.

Herein, in the foregoing several cases, the second network device may indicate, by using the indication information in the second message, whether the second network device has assigned, to the first network device, the permission to determine to configure the default DRB. Then, the first network device may determine, based on the indication information, the permission to configure the default DRB, to complete negotiation on the permission to configure the default DRB. This may avoid a case in which a plurality of network devices all configure default DRBs for one session in a dual-connectivity or multi-connectivity scenario.

In a feasible implementation, the foregoing first message may be specifically a secondary node addition request (S-NODE addition request) message. Optionally, the indication information in the first message may be carried in resource setup information of a protocol data unit session terminated on a secondary node (PDU Session Resource Setup InfoSN terminated) in the S-NODE addition request message. Optionally, the indication information in the first message may be carried in cell group configuration information (cell group configuration information, CG-ConfigInfo) in the S-NODE addition request message. In another feasible implementation, the first message may be specifically a secondary node modification request (S-NODE modification request) message. Optionally, the indication information in the first message may be carried in resource modification information of a protocol data unit session terminated on a secondary node(PDU Session Resource modification InfoSN terminated) in the S-NODE modification request. Optionally, the indication information in the first message may be carried in cell group configuration information (cell group configuration information, CG-ConfigInfo) in the S-NODE modification request message. Optionally, if the indication information carried in the first message is the third indication, the first message may alternatively be a secondary node modification required (S-NODE modification required) message, or the first message may be a secondary node change (S-NODE change required) message. Optionally, the indication information in the first message may be carried in cell group configuration (cell group configuration, CG-Config) in the S-NODE addition request message. If the first network device is a primary network device, and the second network device is a secondary network device, the first message may be a secondary node modification required message or a secondary node change message. This application is not limited to the descriptions herein. In an optional implementation, the first message may alternatively be another interaction message between two network devices in a communication system that uses a dual-connectivity technology or a multi-connectivity technology, and the indication information in the first message may alternatively be other indication information in the interaction message. This is not limited in this embodiment of this application.

It should be understood that, because a default DRB may be configured for each session, in addition to the foregoing indication information, the first message may further carry information used to indicate a session. That is, the first message may further carry information used to indicate a session whose default DRB is under negotiation, and the information may be, for example, an identifier of the session.

It can be learned with reference to the foregoing descriptions that, in this embodiment of this application, the first network device is notified whether the first network device configures the default DRB, to enable the first network device and the second network device to complete negotiation on the permission to configure the default DRB. In this way, only one network device has the permission to configure the default DRB, and a case in which a plurality of network devices all configure default DRBs for one session in a dual-connectivity or multi-connectivity scenario can be avoided.

In some possible cases, if the second network device assigns, to the first network device by using the first message, the permission to determine to configure the default DRB, and the first network determines, based on the first message, to configure the default DRB, after configuring the default DRB, the first network device may further send the configuration information of the default DRB to the terminal device. The terminal device is a terminal device that has a dual-connectivity relationship or a multi-connectivity relationship with the first network device and the second network device. In a feasible implementation, the first network device may send the configuration information of the DRB to the second network device, and the second network device sends the configuration information of the default DRB to the terminal device via an RRC message. In another feasible implementation, the first network device may directly send the configuration message of the default DRB to the terminal device via an RRC message. Optionally, when the first network device confirms to configure the default DRB for the terminal after the first network device receives the first message of the second network device and before the first network device sends a response message of the first message to the second network device, the first network device sends the configuration information of the default DRB to the second network device, and the second network device sends the configuration message of the default DRB to the terminal device via the radio resource control message. When the first network device confirms to configure the default DRB for the terminal after sending the response message of the first message to the second network device, the first network device directly sends the configuration information of the default DRB to the terminal device. Optionally, it may alternatively be specified in a protocol that the first network device can send only the configuration information of the default DRB to the second network device, and the second network device sends the configuration message of the default DRB to the terminal device via the radio resource control message. The configuration information of the default DRB is sent to the terminal device, so that the terminal device may determine the configuration of the default DRB. In this case, during uplink transmission, the terminal device may map, to the default DRB, an uplink QoS flow for which a correspondence between a DRB and a QoS flow is not configured.

In some possible cases, when the second network device assigns, to the first network device by using the first message, the permission to determine to configure the default DRB, and the first network device determines, based on the first message, to configure the default DRB, after configuring the default DRB, if the first network device releases the default DRB, the first network device may send a release indication to the second network device, where the release indication is used to indicate that the first network device has released the default DRB, and the second network device receives the release indication. After releasing the default DRB, the first network device notifies, by using the release indication, the second network device that the first network device has released the DRB, so that the second network device can reconfigure the default DRB.

Figure 4:
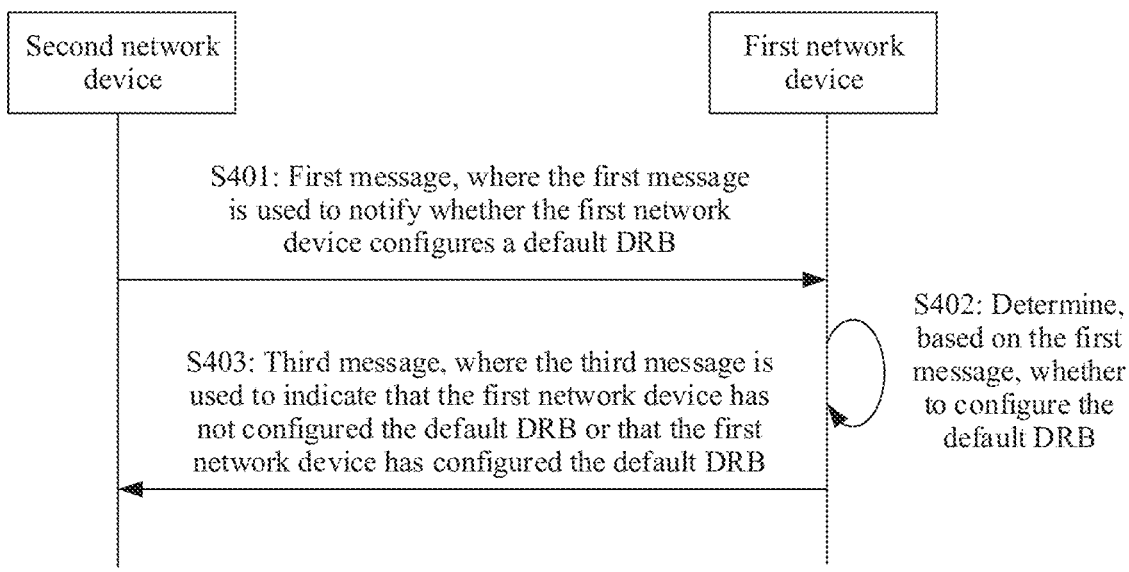
FIG. 4 is a schematic flowchart of another communication method according to an embodiment of this application.

In some possible cases, after receiving the first message, the first network device may further feed back a configuration status of the default DRB to the second network device by using the response message corresponding to the first message. FIG. 4 is a schematic flowchart of another communication method according to an embodiment of this application. This embodiment of this application is described from an interaction perspective. The method may include the following steps:

Step S401: A second network device sends a first message to a first network device, where the first message is used to notify whether the first network device configures a default DRB. The first network device receives the first message.

Step S402: The first network device determines, based on the first message, whether the first network device configures the default DRB.

Herein, for specific descriptions of steps S401 and S402, refer to the related descriptions of steps S301 and S302. Details are not described herein again.

Step S403: The first network device sends a third message to the second network device, where the third message is used to indicate that the first network device has not configured the default DRB or that the first network device has configured the default DRB. The second network device receives the third message.

Herein, the third message is a response to the first message. Specifically, the third message may include indication information, used to indicate whether the first network device has configured the default DRB. For details, refer to indication information in the first message. The indication information in the third message may also be in the following several cases:

Case 1: The third message may include a fourth indication, where the fourth indication is used to indicate that the first network device has configured the default DRB. Optionally, if the third message does not include the fourth indication, the third message is used to indicate that the first network device has not configured the default DRB.

Case 2: The third message may include a fourth indication, where the fourth indication is used to indicate that the first network device has not configured the default DRB.

Optionally, if the third message does not include the fourth indication, the third message is used to indicate that the first network device has configured the default DRB.

Case 3: The third message may include a fifth indication, where the fifth indication is an indication indicating whether the first network device has configured the default DRB. Specifically, the fifth indication may correspond to two different values, and the different values are used to respectively indicate that the first network device has configured the default DRB and indicate that the first network device has not configured the default DRB.

Optionally, the first network device includes the fourth indication or the fifth indication in the third message only when the first network device confirms, based on the first message, that the second network device has assigned, to the first network device, permission to determine to configure the default DRB. In a possible case, the third message only notifies whether the current first network device has configured the default DRB. After sending the third message, the first network device may continue to retain the permission to configure the default DRB. In another possible case, the third message only notifies whether the current first network device has configured the default DRB. After the third message is sent, whether the first network device can subsequently configure the default DRB needs to be re-determined by using a first message subsequently sent by the second network device.

In a possible implementation, when the first network device is a secondary network device, and the second network device is a primary network device, the third message may be specifically a secondary node addition request acknowledge (S-NODE addition request ACKNOWLEDGE) message or a secondary node modification request acknowledge (S-NODE modification request ACKNOWLEDGE) message, and is used to indicate that a request initiated by the second network device is accepted. Optionally, the indication information (namely, the fourth indication or the fifth indication) in the third message may be carried in a cell group configuration CG-Config in the S-NODE addition request ACKNOWLEDGE or the S-NODE modification request ACKNOWLEDGE message. Optionally, if the third message is used to indicate that the first network device has not configured the default DRB, the third message may alternatively be a secondary node addition request reject (S-NODE addition request reject) message or a secondary node modification request acknowledge\ message, and is used to reject a request initiated by the second network device. Optionally, in addition to the foregoing indication information, the third message may further carry information used to indicate a session. That is, the third message may further carry information used to indicate a session for which a configuration status of a default DRB is fed back, and the information may be, for example, an identifier of the session.

Optionally, if the first network device has not configured the default DRB, the third message may include a reason why the first network device has not configured the default DRB.

In this embodiment of this application, after receiving the first message that is sent by the second network device and that is used to notify whether the first network device configures the default DRB, the first network device sends, to the second network device, an indication used to indicate whether the first network device has configured the default DRB, so that the second network device may determine a configuration status of the default DRB on the first network device.

Optionally, in a possible case, a primary network device may alternatively be set to configure the default DRB, to prevent a plurality of network devices having a dual-connectivity relationship or a multi-connectivity relationship with the terminal device from establishing a plurality of default DRBs for a same session. Specifically, if the first network device is a primary network device, the first network device determines to configure the default DRB. If the first network device is a secondary network device, the first network device determines not to configure the default DRB. For descriptions of the primary network device, the secondary network device, and the default DRB, refer to the foregoing descriptions. Details are not described herein again.

An embodiment of this application further provides a communication method in a handover scenario, which may be applied to a scenario in which a primary network device changes in dual-connectivity or multi-connectivity. In this scenario, a source primary network device notifies a target primary network device of a configuration status of a corresponding default DRB. The communication method may include the following steps: The source primary network device sends the configuration status of the default DRB to the target primary network device; the target primary network device receives the configuration status of the default DRB sent by the source primary network device.

Herein, the source primary network device is a primary network device corresponding to the dual-connectivity or multi-connectivity before the primary network device is changed, and the target primary network device is a primary network device corresponding to the dual-connectivity or multi-connectivity after the primary network device is changed.

Specifically, the source primary network device may include the configuration status of the default DRB in a handover request message. The configuration status of the default DRB herein refers to a negotiation status of the default DRB between the source primary network device and a source secondary network device. The configuration status of the default DRB may be used to indicate whether the primary network device configures the default DRB or the secondary network device configures the default DRB.

In a feasible implementation, the configuration status of the default DRB may be carried in handover preparation information (handoverPreparationInformation) in the handover request message.

Herein, a default DRB may be configured for each session, and the configuration status of the default DRB is a configuration status of a default DRB of a session. Therefore, in addition to the configuration status of the default DRB, the handover request message may further carry information used to indicate the session. That is, the handover request message may further carry information used to indicate a session whose default DRB is under negotiation, and the information may be, for example, an identifier of the session.

Herein, after the target primary network device receives the configuration status of the default DRB sent by the source primary network device, the target primary network device may inherit a negotiation result of the default DRB between the source primary network device and the source secondary network device. For example, if the result of negotiation between the source primary network device and the source secondary network device is that the source primary network device configures the default DRB for a session, the target primary network device may also notify the target secondary network device that the target primary network device configures the default DRB for the session. Optionally, the target primary network device may further renegotiate a configuration of a default DRB of a PDU session with the target secondary network device based on a policy of the target primary network device.

Optionally, the source secondary network device and the target secondary network device may be a same network device, or may be different network devices.

The method in this application is described in detail above. To better implement the method in this application, correspondingly, an apparatus in this application is provided below.

Figure 5:
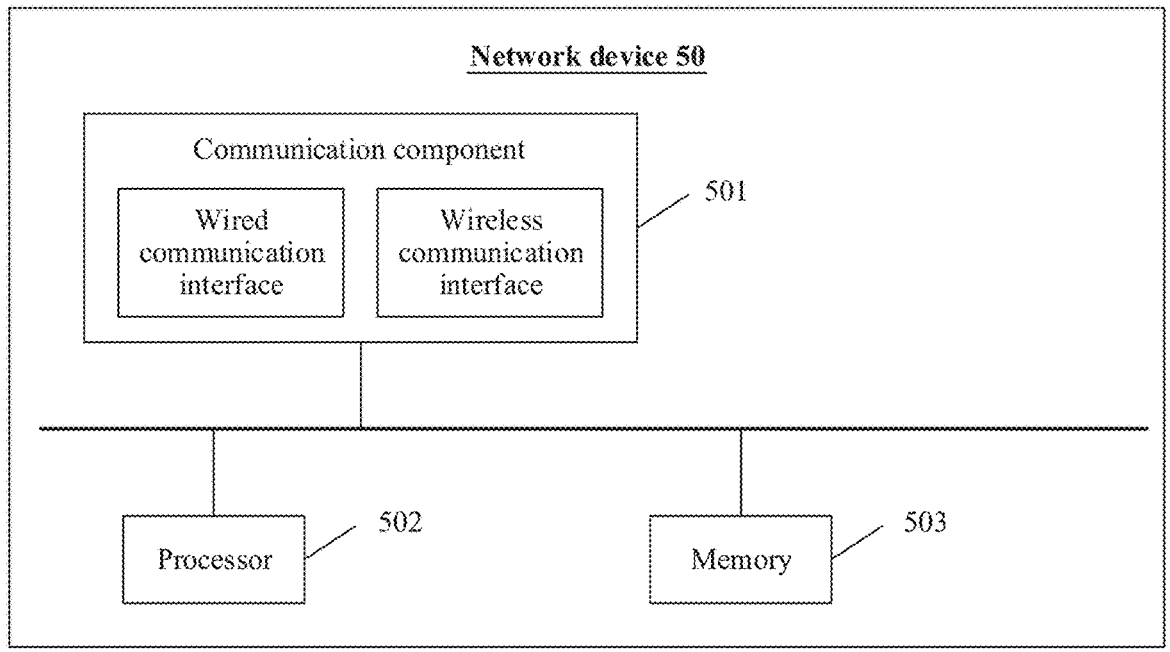
FIG. 5 is a schematic structural diagram of a network device according to this application.

FIG. 5 is a schematic structural diagram of a network device 50 according to this application. The network device 50 may be implemented as the network device 2021 or the network device 2022 in the communication system shown in FIG. 2. As shown in FIG. 5, the network device 50 may include a communication component 501, one or more processors 502, and a memory 503. The communication component 501, the processor 502, and the memory 503 may be connected by using one or more buses, or may be connected in another manner.

The communication component 501 may be used by the network device 50 to communicate with another communication device, and the another communication device may be, for example, another network device, a core network device, or a terminal device. The communication component 501 may include a wired communication interface, for example, an Ethernet interface or an optical fiber interface. Optionally, the communication component 501 may further include a wireless communication interface. Specifically, the communication component 501 may include a radio frequency interface and a radio frequency circuit, to implement a function implemented by the wireless communication interface. The radio frequency circuit may include a transceiver, a component (such as a conductor or a conducting wire) configured to send and receive an electromagnetic wave in free space during wireless communication, and the like.

In this embodiment of this application, the communication component 501 may be configured to perform a receiving or sending operation performed by the first network device in the embodiment in FIG. 3 or FIG. 4. The operation may include step S301, and/or step S401 and step S403. The communication component 501 may also be configured to perform a receiving or sending operation performed by the second network device in the embodiment shown in FIG. 3 or FIG. 4. The operation includes step S301, and/or step S401 and step S403.

The memory 503 is coupled to the processor 502, and is configured to store various software programs and/or a plurality of groups of instructions. During specific implementation, the memory 503 may include a high-speed random access memory, and may further include a non-volatile memory. The memory 503 may store a network communication program, and the network communication program may be used to perform communication with another communication device. The memory 503 may further include a built-in operating system, for example, an operating system such as Windows or Linux.

In some embodiments of this application, the memory 503 may be configured to store a program for implementing a communication method provided in one or more method embodiments of this application on a first network device side and/or a second network device side.

The processor 502 may be a general purpose processor, for example, a central processing unit (central processing unit, CPU). The processor 502 may alternatively be a hardware chip. The hardware chip may be one or a combination of the following: an application-specific integrated circuit (application-specific integrated circuit, ASIC), a field programmable gate array (field programmable gate array, FPGA), or a complex programmable logic device (complex programmable logic device, CPLD). Alternatively, the processor 502 may be a combination of the foregoing processors. The processor 502 may process data received by the communication component 501, and the processor 502 may further process data that is to be sent to the communication component 501 for transmission over a wireless transmission medium or wired transmission medium.

The processor 502 may be configured to read and execute computer-readable instructions. Specifically, the processor 502 may be configured to: invoke the program stored in the memory 503, for example, the program for implementing the communication method provided in the one more method embodiments of this application on the first network device side and/or the second network device side; and execute instructions included in the program in combination with the communication component 501.

In this embodiment of this application, the processor 502 may be configured to perform step S301 and/or step S401 and step S403 by using the communication component 501.

It should be understood that the network device 50 shown in FIG. 5 is merely an implementation of this application. During actual application, the network device 50 may include more or fewer components. This is not limited in this application.

Figure 1:
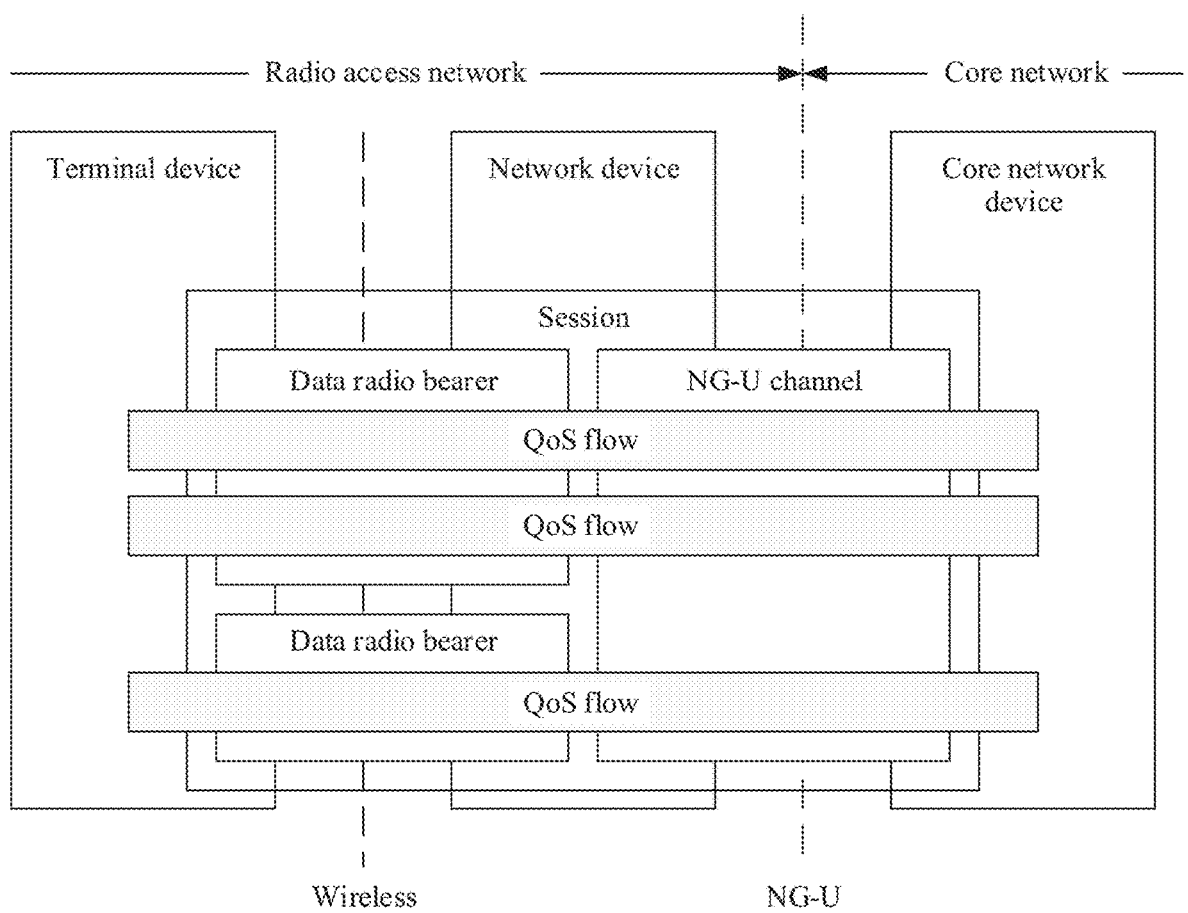
FIG. 1 is a schematic diagram of a QoS architecture in which a QoS flow is used as a basic granularity of QoS control.
Figure 6:
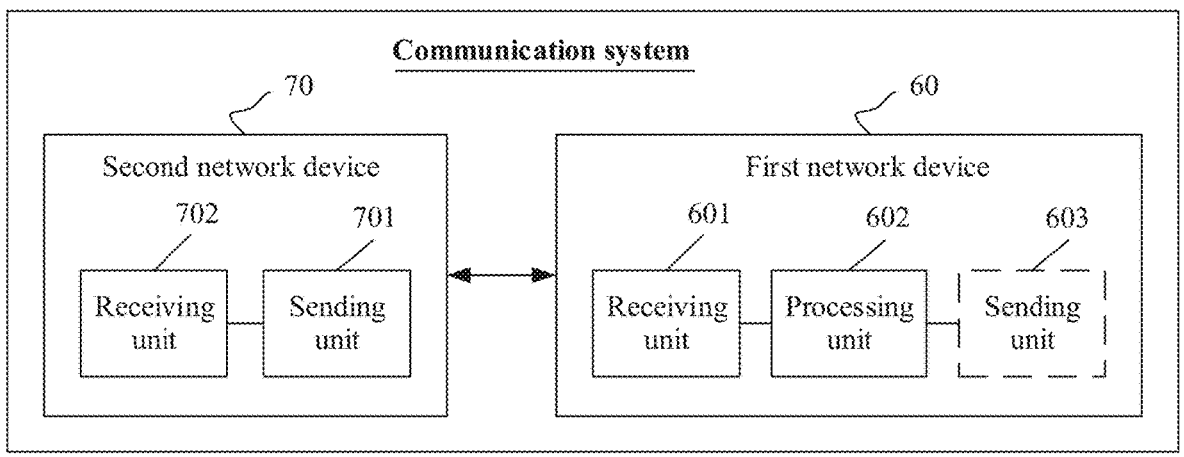
FIG. 6 is a functional block diagram of a communication system and a network device according to this application.

FIG. 6 shows a communication system, a first network device, and a second network device according to this application. The communication system includes a first network device 60 and a second network device 70. The first network device and the second network device are network devices that provide a multi-connectivity service for a same terminal device. The communication system may be the communication system 10 described in FIG. 2, the first network device 60 may be the network device 2021 in the system shown in FIG. 1, and the second network device may be the network device 2022 in the system shown in FIG. 2. Descriptions are separately provided below.

As shown in FIG. 6, the first network device 60 may include a sending unit 603 and a receiving unit 601.

The receiving unit 601 is configured to receive a first message sent by the second network device, where the first message is used to notify whether the first network device configures a default DRB.

The processing unit 602 is configured to determine, based on the first message, whether the first network device configures the default DRB.

Herein, the receiving unit 601 may be configured to perform step S301 in the embodiment in FIG. 3 or step S401 in the embodiment in FIG. 4. The processing unit 602 may be configured to perform step S302 in the embodiment in FIG. 3, or step S402 in the embodiment in FIG. 4.

Optionally, the first network device may include a sending unit 603.

The sending unit 603 is configured to: after the default DRB is configured, if the first network device releases the default DRB, send a release indication to the second network device, where the release indication is used to indicate that the first network device has released the default DRB.

Optionally, the sending unit 603 is further configured to: after the default DRB is configured, send configuration information of the default DRB to the terminal device.

Optionally, the sending unit 603 is further configured to send a third message to the second network device, where the third message is used to indicate that the first network device has not configured the default DRB or that the first network device has configured the default DRB.

Herein, the sending unit 603 may be configured to perform step S403 in the embodiment in FIG. 4.

As shown in FIG. 6, the second network device 70 may include a sending unit 701.

The sending unit 701 is configured to send the first message sent to the first network device, where the first message is used to notify whether the first network device configures the default DRB.

Herein, the sending unit 701 may be configured to perform step S301 in the embodiment in FIG. 3, or step S401 in the embodiment in FIG. 4.

Optionally, the second network device 70 may further include a receiving unit 702.

The receiving unit 702 is configured to receive the release indication sent by the first network device, where the release indication is used to indicate that the first network device has released the default DRB.

Optionally, the receiving unit 702 is further configured to receive the third message sent by the first network device, where the third message is used to indicate that the first network device has not configured the default DRB or that the first network device has configured the default DRB.

Herein, the receiving unit 702 may be configured to perform step S403 in the embodiment in FIG. 4.

In this embodiment of this application, for descriptions about the first message, the default DRB, the second message, the release indication, the third message, and the like, refer to the related descriptions in the foregoing method embodiments. Details are not described herein again.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer program instructions are loaded and executed on a computer, the procedures or functions according to the embodiments of this application are all or partially generated. The computer instructions may be stored in a computer-readable storage medium, or may be transmitted by using a computer-readable storage medium. The computer-readable storage medium may be any usable medium accessible by a computer, or a data storage device, such as a server or a data center, integrating one or more usable media. The usable medium may be a semiconductor medium (for example, an SSD), or the like.

A person of ordinary skill in the art may be aware that, in combination with the examples described in the embodiments disclosed in this specification, modules and method steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It should be noted that "first", "second", "third", and various numbers in the embodiments of this application are merely used for differentiation for ease of description, and are not intended to limit the scope of the embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a first network device, first information from a second network device, wherein the first information is used to indicate whether the first network device configures a default data radio bearer (DRB), wherein the first network device and the second network device are network devices that provide a multi-connectivity service for a same terminal device, and wherein the first information includes indication information indicating that the second network device has assigned, to the first network device, a decision right to configure the default DRB; and
determining, by the first network device based on the first information, whether to configure the default DRB, wherein when the first information indicates that the first network device is allowed to configure the default DRB, the determining, by the first network device based on the first information, whether to configure the default DRB comprises:
determining, by the first network device, to configure the default DRB or not to configure the default DRB.

2. The method according to claim 1, wherein when the first information is used to indicate that the first network device does not configure the default DRB, the determining, by the first network device based on the first information, whether to configure the default DRB comprises:
determining, by the first network device, not to configure the default DRB.

3. The method according to claim 1, wherein the first information is comprised in a first message.

4. The method according to claim 3, wherein the first message is a secondary node addition request message, and wherein the first information is comprised in resource setup information of a protocol data unit session terminated on a secondary node in the secondary node addition request message.

5. The method according to claim 3, wherein the first message is a secondary node modification request message, and wherein the first information is comprised in resource modification information of a protocol data unit session terminated on a secondary node in the secondary node modification request message.

6. The method according to claim 3, wherein the first message further comprises information about a session corresponding to the first information, and wherein the session information is used to indicate whether the first network device configures a default DRB of the session.

7. The method according to claim 1, wherein when the first network device determines, based on the first information, to configure the default DRB, the method further comprises:
sending, by the first network device, configuration information of the default DRB to the terminal device.

8. The method according to claim 1, wherein after the determining, by the first network device based on the first information, whether to configure the default DRB, the method further comprises:
  determining, by the first network device, a moment at which the default DRB is configured.

9. The method according to claim 1, wherein after the determining, by the first network device based on the first information, whether to configure the default DRB, the method further comprises:
  after configuring the default DRB, sending, by the first network device, configuration information of the default DRB to the terminal device.

10. The method according to claim 1, wherein the first network device is a secondary network device, and wherein the second network device is a primary network device.

11. The method according to claim 1, wherein the first information is comprised in a first message, the first message comprises an identifier of a protocol data unit session, and the identifier is used to notify the first network device whether to configure the default DRB for the protocol data unit session.

12. A network device, comprising:
  at least one processor; and
  one or more memories coupled to the at least one processor and storing programming instructions for execution by the at least one processor to perform operations comprising:
    receiving first information from a second network device through a communication interface, wherein the first information is used to indicate whether the network device configures a default data radio bearer (DRB), wherein the network device and the second network device are network devices that provide a multi-connectivity service for a same terminal device, and wherein the first information includes indication information indicating that the second network device has assigned, to the network device, a decision right to configure the default DRB; and
    determining, based on the first information, whether to configure the default DRB, wherein when the first information indicates that the network device is allowed to configure the default DRB, the determining, based on the first information, whether to configure the default DRB comprises:
      determining, based on the first information, to configure the default DRB or not to configure the default DRB.

13. The network device according to claim 12, wherein when the first information is used to indicate that the network device does not configure the default DRB, the determining, based on the first information, whether to configure the default DRB comprises:
  determining not to configure the default DRB.

14. The network device according to claim 12, wherein the first information is comprised in a first message.

15. The network device according to claim 14, wherein the first message is a secondary node addition request message, and wherein the first information is comprised in resource setup information of a protocol data unit session terminated on a secondary node in the secondary node addition request message.

16. The network device according to claim 14, wherein the first message is a secondary node modification request message, and wherein the first information is comprised in resource modification information of a protocol data unit session terminated on a secondary node in the secondary node modification request message.

17. The network device according to claim 14, wherein the first message further comprises information about a session corresponding to the first information, and wherein the session information is used to indicate whether the network device configures a default DRB of the session.

18. The network device according to claim 14, wherein when the network device configures the default DRB based on the first information, the operations further comprise:
  sending configuration information of the default DRB to the terminal device.

19. The network device according to claim 14, wherein the operations further comprise:
  determining a moment at which the default DRB is configured.

20. The network device according to claim 14, wherein the operations further comprise:
  after configuring the default DRB, sending configuration information of the default DRB to the terminal device.

21. The network device according to claim 12, wherein the first information is comprised in a first message, the first message comprises an identifier of a protocol data unit session, and the identifier is used to notify the network device whether to configure the default DRB for the protocol data unit session.

22. A non-transitory computer-readable storage medium, comprising instructions which, when executed by one or more processors in a first network device, cause the first network device to perform operations comprising:
  receiving first information from a second network device, wherein the first information is used to indicate whether the first network device configures a default data radio bearer (DRB), wherein the first network device and the second network device are network devices that provide a multi-connectivity service for a same terminal device, and wherein the first information includes indication information indicating that the second network device has assigned, to the first network device, a decision right to configure the default DRB; and
  determining, based on the first information, whether to configure the default DRB, wherein when the first information indicates that the first network device is allowed to configure the default DRB, the determining, based on the first information, whether to configure the default DRB comprises:
    determining, based on the first information, to configure the default DRB or not to configure the default DRB.

* * * * *